April 24, 1951     R. B. COTTON     2,550,229
AIR DRIVEN IMPELLER

Filed Aug. 26, 1946     5 Sheets-Sheet 1

INVENTOR.
ROBERT B. COTTON.
BY John F. Robertson
HIS ATTORNEY.

April 24, 1951

R. B. COTTON 2,550,229

AIR DRIVEN IMPELLER

Filed Aug. 26, 1946

INVENTOR.
ROBERT B. COTTON.
BY John H. Robertson
HIS ATTORNEY.

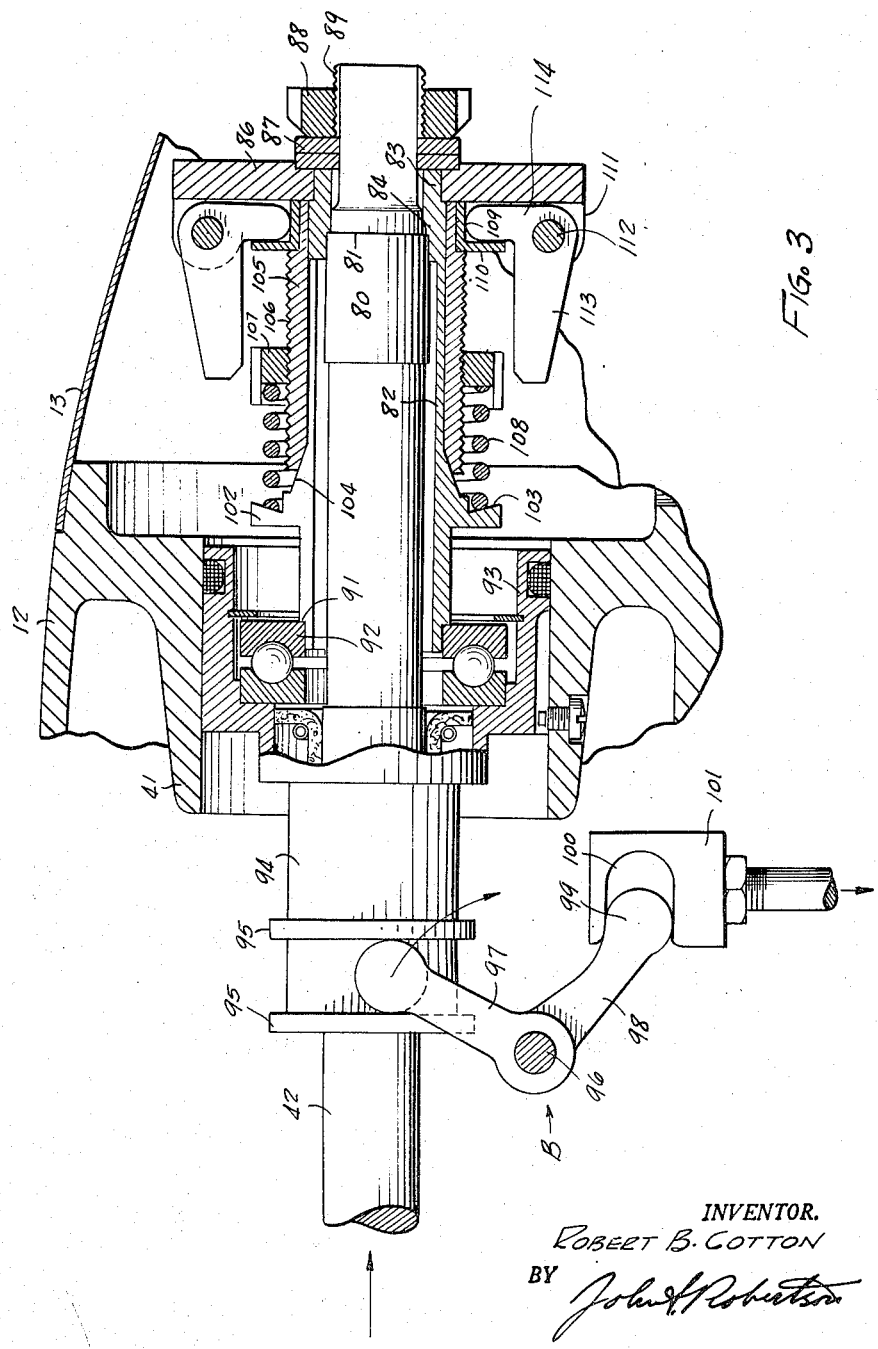

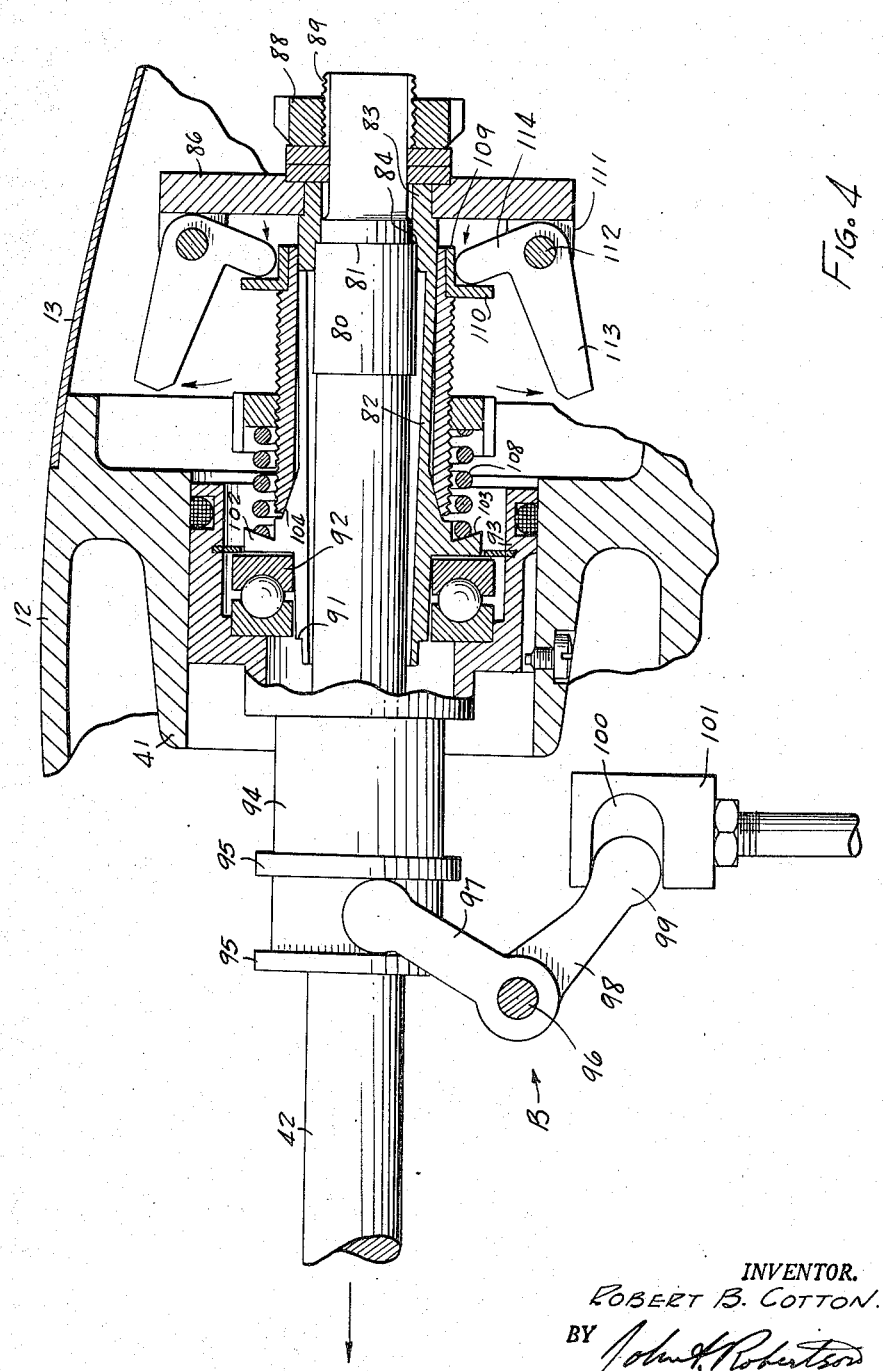

April 24, 1951 R. B. COTTON 2,550,229
AIR DRIVEN IMPELLER
Filed Aug. 26, 1946 5 Sheets-Sheet 5
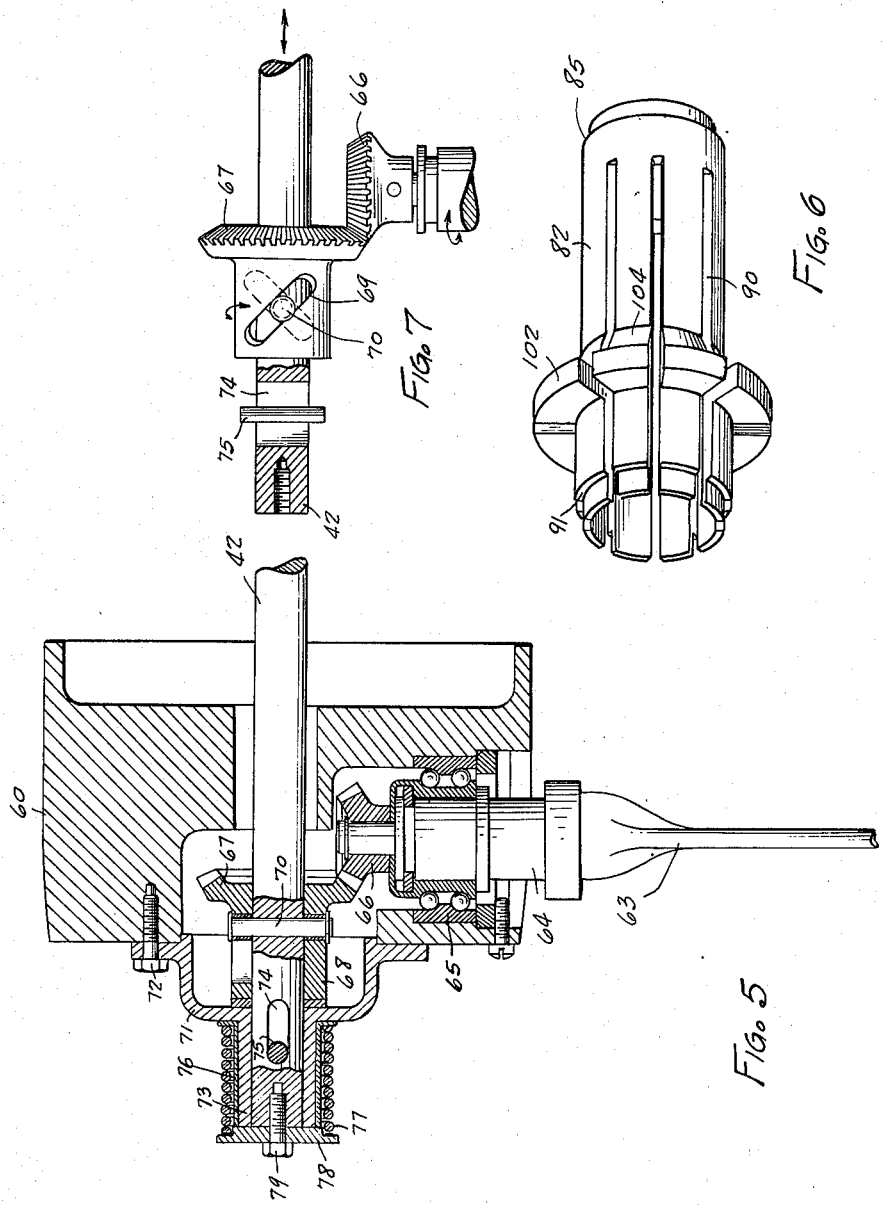
INVENTOR.
ROBERT B. COTTON
BY
HIS ATTORNEY.

Patented Apr. 24, 1951

2,550,229

UNITED STATES PATENT OFFICE 2,550,229

AIR-DRIVEN IMPELLER

Robert B. Cotton, Lansdowne, Pa., assignor to All American Airways, Inc., a corporation of Delaware Application August 26, 1946, Serial No. 693,044

3 Claims. (Cl. 170—62)

This invention relates to air driven impellers such as are intended to be mounted on aircraft for the purpose of generating power and is concerned primarily with certain improvements designed to facilitate adjustment to develop varying degrees of power and increase the conditions of safety with which such impellers may be used.

Due to recent developments in the field of aircraft, particularly in the picking up and towing of gliders, it becomes necessary to have available on the aircraft a source of power which will develop considerable power. Such power is needed in the reeling in of glider tow lines and when it is considered that under many conditions a heavy glider is at the other end of a tow line, a large amount of horsepower is required. While it might be possible to provide an electric installation for generating this power, the large number of horsepower would require such a heavy installation as to render it undesirable in aircraft where weight is a great factor. Accordingly, it has been the practice to employ air driven impellers which derive the power from the forward movement of the plane and which are capable of generating a high degree of horsepower with comparatively light installations. The present invention deals with improvements in such air driven impellers.

An important object of the invention is the provision of an air driven impeller including vanes of adjustable pitch which may be adjusted to derive any power from zero up to a maximum. The zero development is created when the vanes are fully feathered and the maximum is that angular position of the blades at which full power is developed. By providing appropriate mechanism for adjusting the pitch of the blades any required amount of power may be developed over this range as occasion demands.

Air driven impellers of the type with which this invention is concerned include vanes which are driven at a high rate of speed, often attaining a speed of rotation in the neighborhood of four-thousand revolutions a minute. When the impeller is properly loaded there is no particular danger, but should the load rapidly diminish or be entirely taken off the impeller, there is grave danger of the high speed rotation wrecking the mechanism by centrifugal force and this is, of course, attended by a possibility of injury to personnel.

Accordingly, a highly important object of the invention is the provision of an air driven impeller including adjustable pitch blades, together with means for automatically feathering the vanes when a certain pre-determined speed of rotation is exceeded.

Yet, another object of the invention is the provision, in an air driven impeller of the type indicated, of means for varying the speed at which the blades will automatically feather.

Other more detailed objects and advantages of the invention will in part become apparent and in part be hereinafter stated as the description of the invention proceeds.

The invention therefore comprises an air driven impeller including adjustable pitch blades, together with mechanism for adjusting the pitch of the blades to develop the degree of power required and means for causing the blades to automatically feather when a certain predetermined safe speed of rotation is exceeded.

For a full and more complete understanding of the invention, reference may be had to the following description and accompanying drawings wherein:

Figure 3 is an enlarged detail showing mostly in section bringing out the governor and associated mechanism for causing the automatic feathering.

Figure 4 is another view similar to Figure 3 showing the position of the parts after the fully feathered condition is established.

Figure 5 is a detailed view taken as a section through the end of the impeller at which the vanes are located. This view brings out the position of the parts in which maximum power is developed.

Figure 6 is an enlarged detailed perspective of one highly important element of the governor mechanism, and Figure 7 is a side view largely in elevation and partly in section of the mechanical elements which adjust the pitch of the vanes.

Figure 1:
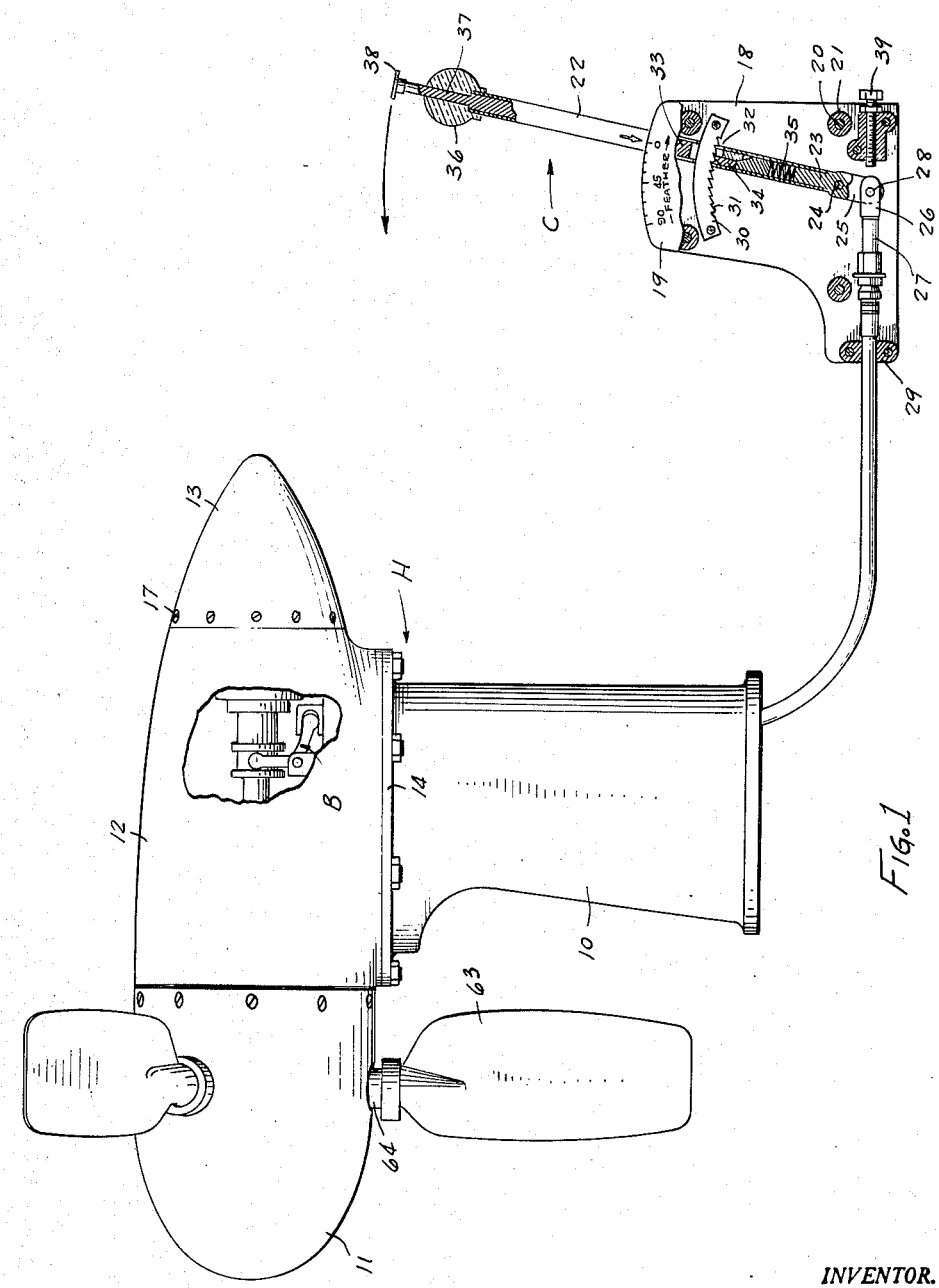
Figure 1 is a side view of an impeller embodying the precepts of this invention shown with parts broken away. This view also develops the control lever which governs the amount of power developed and which may be located at a point remote from the impeller itself.

Referring now to the drawings wherein like reference characters denote corresponding parts and first more particularly to Figure 1, the impeller of this invention is shown as comprising the mechanism proper and the control therefor. The mechanism which actually develops the power is preferably mounted on a wing of the aircraft on which the impeller is assembled.

Thus, the housing structure for the various mechanisms is referred to in its entirety by the reference character H. The housing H comprises an upright standard 10 of hollow construction is is clearly shown in Figure 2 and a torpedo like casing made up of a nose 11, central portion 12, and tail 13. It will be noted that the upper end of the standard 10 is formed with a ring-like flange 14 which is in abutting relation with a solid ring-like structure 15 which is formed as an integral part of the casing section 12. Screw bolts shown at 16 secure the flange 14 and ring 15 together. The tailpiece 13 is affixed to the casing section 12 by screw fastening elements shown at 17. The nosepiece 11 rotates with respect to the remainder of the casing structure and is secured in proper position relative thereto by mechanism to be hereinafter described.

Referring again to Figure 1, the control for adjusting the pitch of the vanes is identified in its entirety by the reference character C. This control may be located at any convenient location in the fuselage of the plane. It comprises a pair of spaced panels 18 and 19 which are held in proper assembled relation by the required number of bolts 20 and spacer sleeves 21. These panels 18 and 19 are anchored in a desired location. A control lever 22 of tubular formation receives in its lower end the reduced end of a solid element 23 which is pivotally mounted at 24 between the panels 18 and 19. The lower end of this solid member 23 is bifurcated as shown at 25, and received in the fork construction is the flat end 26 of a flexible push rod 27. Pivot pin 28 establishes the connection between the flexible push rod 27 and the control lever 22. This flexible push rod 27 passes through a guide 29 mounted between the panels 18 and 19 and extends up into the standard 10.

A ratchet segment 30 is mounted on the panel construction and this segment presents ratchet teeth 31 in a downwardly exposed position. Control rod 22 is slotted as indicated at 32 to receive the ratchet segment 30. A plunger 33 is positioned within the tubular control rod 22 and carries a pointed tooth 34 which normally engages one of the ratchet teeth 31. An expansion coil spring 35 bears against the solid member 23 at one end, and the other end is rendered effective against the pointed tooth 34 to yieldably urge the latter into engagement with the ratchet teeth. A handle is shown in the form of a round knob 36 and this handle is mounted on the upper end of the tubular control rod 22. This knob 36 is formed with an axial passage in alignment with a bore of the tube 22. The plunger 33 has a reduced portion 37 received in this axial passage and carries at its free end a push tab 38. It is evident that the operator may grasp the knob 36 with his hand and at the same time with his thumb depress the tab 38. This pushes the tooth 34 downwardly against the influence of the spring 35 and releases it from engagement with the ratchet teeth. The control lever may now be moved in a clockwise direction. Movement in a counterclockwise direction is not opposed by the ratchet teeth due to the formation thereof.

An adjustable stop for limiting clockwise movement of the control lever is shown in the form of a set screw 39 which is mounted between the panels and the free end of which is adapted to be engaged by the lower end 23 of the lever.

Figure 2:
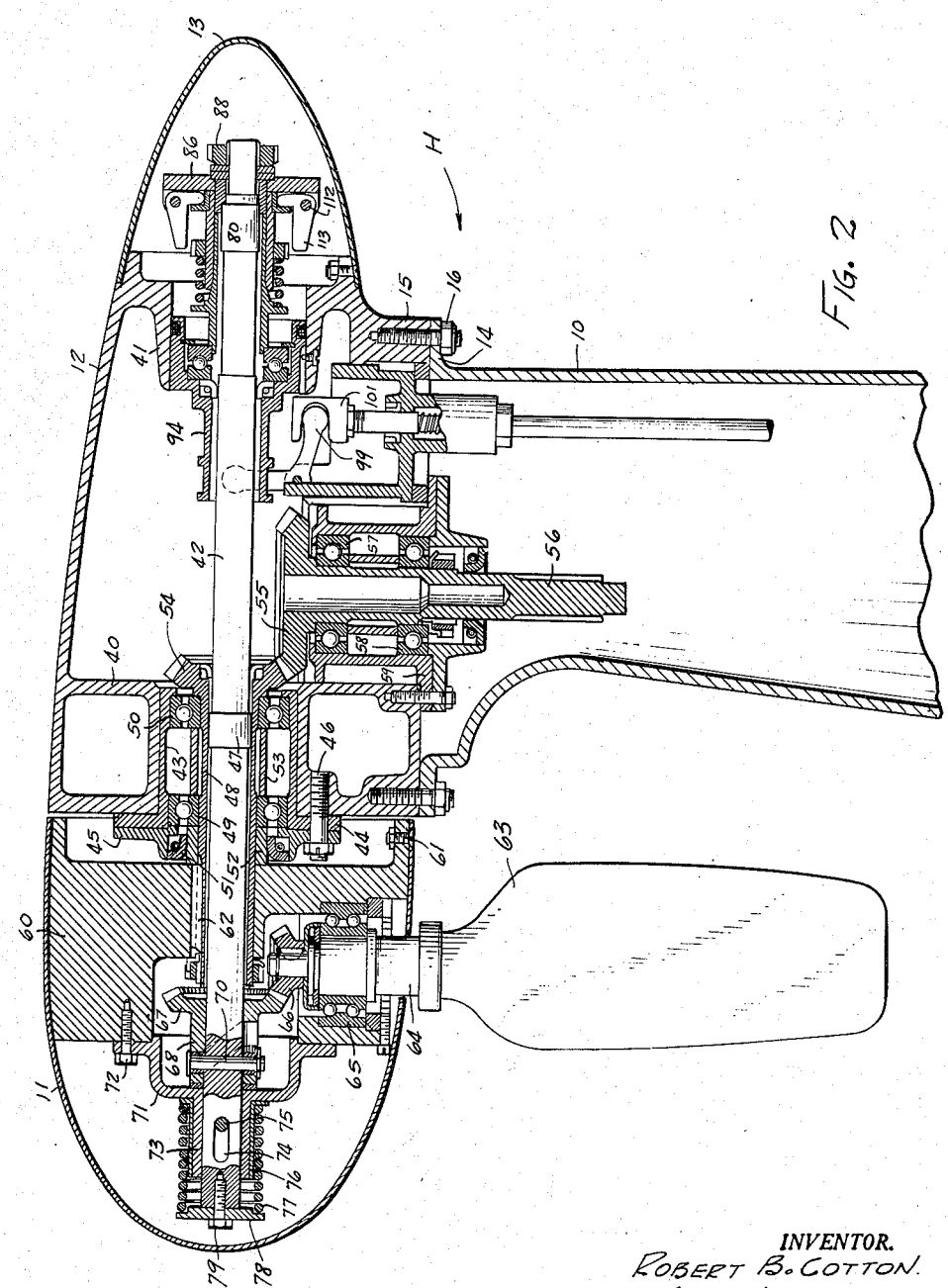
Figure 2 is a section taken through the impeller mechanism proper.

Referring now more particularly to figure 2, the mechanism which actually develops the power will be described. The main casing section 12 is formed with a main journal 40 which may be of the hollow construction indicated to keep weight down to a minimum. This section 12 also carries a second journal construction 41 adjacent to the tail, and it is these journals 40 and 41 which operatively support the main shaft 42, there being various parts interposed between the journals and the shaft.

Received in the tubular bore of the journal 40 is a cylindrical sleeve 43 having an end flange 44 which abuts the front end of the journal 40. A retaining ring 45 in turn abuts the flange 44 and screw bolts 46 securely clamp both the retaining ring 45 and the flange 44 to the journal construction 40.

It will be noted that the shaft 42 carries an enlargement in the form of a spacer ring 47. Rotatively mounted with respect to the shaft 42 is a driving sleeve 48 which fits over the enlargement 47. Bearing assemblies 49 and 50 are interposed between the sleeve 43 and the driving sleeve 48. An oil seal is shown at 51 as being held in position by the retaining ring 45. Cooperating with this oil seal 51 is a ring 52 which snugly fits about the driving sleeve 48. A spacer ring shown at 53 serves to maintain the bearing assemblies 49 and 50 in properly spaced relation.

The inner end of the driving sleeve 48 terminates in a bevel gear 54 which, of course, surrounds the shaft 42. This bevel gear 54 meshes with a complemental bevel gear 55 which is carried at the upper end of a power take-off shaft designated at 56. The latter is journaled on bearing assemblies 57 and 58 which in turn are supported by the ring-like structure 59 which is bolted to the casing 12. The power take-off shaft 56 extends downwardly through the standard 10 and at its lower end may be operatively connected to any mechanical device which it is desired to drive by the impeller. Such connection is not a part of this invention and is therefore not herein described.

Snugly fitted within the shell-like nose 11 is a hub member 60. Screw fastening elements shown at 61 establish a permanent connection between the nose and the hub. The driving sleeve 48 is keyed to the hub 60 as shown at 62. The hub 60 carries a plurality of adjustable pitch blades. For illustrative purposes, it may be assumed that there are three such blades although this number may be varied as occasion demands. Inasmuch as these blades are substantial duplicates, it is necessary to describe only one of them for the purpose of this specification. Such a blade or vane is shown at 63 and includes a reduced neck 64 of cylindrical formation which extends into the hub. The hub 60 is formed with a recess to accommodate the reduced neck 64 of each vane. A bearing assembly shown at 65 is mounted in each recess and is interposed between the reduced neck 64 and the hub 60. The inner end of each neck 64 drivably carries a bevel gear 66. This gear 66 meshes with a complemental bevel gear 67 which is carried at one end of a sleeve 68 that is rotatively mounted on the shaft 42. The sleeve 68 is formed with a pair of oppositely disposed helical slots which are more clearly shown in Figure 7 at 69. These slots are also shown in dotted lines in Figure 2. An actuating pin 70 is carried by the shaft 42 and has its ends received in the slots 69. The shaft 42 is held against rotation with respect to the hub 60 as will be later described. Thus, upon rectilinear movement of the shaft 42 the pin 70 will cause relative rotation of the sleeve 68 with respect thereto. This in turn drives the bevel gear 67 and through the bevel gear 66 adjusts the pitch of the blade 63.

The hub 60 is cut away to provide a recess which accommodates the bevel gears 66 and 67. The recess is closed by a cap 71 that is bolted to the hub 60 as shown at 72. This cap 71 includes a cylindrical extension 73 in which the shaft 42 is received. The latter is slotted as shown at 74 and a pin 75 is received in this slot. The ends of this pin are anchored in the extension 73. It is this pin and slot construction which prevents relative rotation of the hub 60 and the shaft 42.

Fitted over the extension 73 is a spring retainer 76 and fitted over the latter is an expansion coil spring 77. The latter bears against an end plate 78 which is anchored to the shaft 42 by the screw bolt 79. It is evident that the normal tendency of the spring 77 is to urge the shaft 42 forwardly into the nosepiece.

Referring now more particularly to Figures 3 and 4, the mechanism for control of the rectilineal movement of the shaft 42 will be described. The tail end of the shaft 42 carries an enlargement 80 which presents a shoulder 81. A collapsible sleeve which is shown in detail in Figure 6 is designated 82. This sleeve 82 has at its tail end a hub structure 83 formed with a shoulder 84 which abuts the shoulder 81. The sleeve 83 also has an external shoulder 85 (Figure 6) against which abuts a governor plate 86. Washers 87 are mounted on the shaft 42 and bear against the tail end of the sleeve 82 and the governor plate 86. A nut 88 is screwed on to threads 89 which are formed on the end of the shaft 42. This nut serves to securely clamp the sleeve 82 into position with its shoulder 84 abutting the shoulder 81 on the shaft and also positions the governor plate 86.

The sleeve 82 is formed with a plurality of slots 90 (see Figure 6) which extend inwardly from the forward end of the sleeve and these slots render the sleeve of the collapsible nature. The structure between the slots might properly be described as spring fingers which are capable of being collapsed inwardly. Adjacent the inner end, the sleeve 82 is reduced in diametric dimension to provide a shoulder 91 which normally engages a complemental shoulder on a bearing assembly 92. The latter is positioned within a cup-shaped extension 93 that is formed as an integral part of an actuating sleeve 94. This cup shaped extension is slidably received in the journal construction 41 and it will be noted from Figure 2 that the actuating sleeve 94 is disposed in spaced relation about the shaft 42. The sleeve 94 is provided with a pair of spaced ringlike flanges 95. A bell crank which is referred to in its entirety by the reference character B is pivotally mounted on a pin 96 to structure carried as a part of casing 12. One arm of this bell crank takes the form of a fork 97, the extremities of which are received between the flanges 95. The other end of the bell crank 98 has an extremity 99 which is operatively received in a recess 100 formed in a member 101, carried at the effective free end of the flexible push rod 27. Thus, the push rod 27 may be availed of to actuate the bell crank B. Such movement in turn through the connection of the fork arm 97 and flanges 95 imparts rectilineal movement to the actuating sleeve 94. If this movement is towards the tail, it will be resisted by the spring 77 because of the engagement of the shoulder 91 with the bearing assembly 92. Movement of the sleeve 94 and shaft 42 toward the nose is, of course, aided and caused by the spring 77.

Referring now more particularly to Figure 6, it will be noted that the sleeve 82 intermediate its extremities is formed with a radial enlargement in the form of a ring 102. Adjacent to its outer peripheral edge, the tailpiece of this ring 102 is slightly dished as shown in 103 (see Figure 3) whereby it is adapted to function as a spring retainer. Between the ring 102 and its solid end, the sleeve 82 is formed with a conical surface 104 for a purpose now to be described. A governor sleeve 105 is slidably mounted over the sleeve 82 and its free end is formed with a conical bore complemental to the surface 104. The outer cylindrical surface of the governor sleeve 105 is threaded as shown at 106 and screwed on to this threaded surface is a spring retainer 107. An expansion coil spring 108 is interposed between the surface 103 of the ring 102 and the spring retainer 107. This spring 108 resists forward movement of the governor sleeve 105. The degree of this resistance may be varied by adjusting the spring retainer 107 on the threads 106.

The tail-end of the governor sleeve 105 is reduced in diameter whereby it is adapted to receive and carry a ring 109 having a flange 110. The governor plate 86 is formed with a plurality of ears 111 and pivotally mounted on each ear as by a pin shown at 112, is a bell crank governor element 113 having an arm 114 which extends into engagement with the flange 110. It is evident that as the speed of rotation of the shaft 42 increases, the main arms of the bell crank 113 move radially outwardly under centrifugal force. This causes the arms 114 to be moved towards the nose. Thus, the governor sleeve 105 is urged forwardly until such a point as the resistance of the spring 108 is overcome, whereupon the conical bore of the governor sleeve 105 acting on the conical surface 104 of the sleeve 82 collapses the forward end of the latter. Thus, the shoulder 91 is disengaged from the bearing assembly 92 and the spring 77 is rendered effective to move the shaft 42 forwardly and bring the blades 63 into a fully feathered position.

*Operation*

While the operation of the above described mechanism is believed to be apparent from the foregoing description of the various mechanical assemblies, it may be noted that under a condition of no power development the blades 63 are fully feathered. Should the operator be desirous of developing power, he thereupon grasps the handle knob 36 of the control and moves the lever 22 in a counterclockwise direction. This exerts a pull on the flexible rod 27. This moves the arm 98 of the bell crank B downwardly causing movement of the forked arms 97 towards the tail. This moves the actuator sleeve 94 in the same direction and due to the engagement of the shoulder 91 with the bearing assembly 92, the shaft 42 is moved toward the tail. Thus, the pin 70 is moved in the helical slot 69 and causes rotation of the sleeve 63 relative to the hub 60. This relative rotation is transmitted through the bevel gears 67 and 66 to the blades 63 whereby the pitch of the latter is adjusted to develop the required degree of power. Any time the power developed is to be increased, the lever 22 of the control is moved in a counterclockwise direction and any time it is to be decreased, it is moved in a clockwise direction.

Should a condition of no load or a rapidly diminishing load develop and the speed of rotation of the hub 60 exceed a predetermined safe limit, the governor mechanism is brought into play. As above described, this mechanism causes a collapse of the sleeve 82 whereupon the shoulder 91 is disengaged from the bearing assembly 92 and the spring 77 rendered effective to move the shaft 42 into the nose and automatically bring the blades 63 into a fully feathered position. The point at which the impeller will automatically feather may be adjusted by varying the tension of the spring 108 which is accomplished by adjusting the position of the spring retainer 107 on the governor sleeve 105.

While a preferred specific embodiment of the invention is hereinbefore set forth, it is to be clearly understood that the invention is not to be limited to the exact construction illustrated and described because various modifications of these details may be provided in putting the invention into practice within the purview of the appended claims.

What is claimed is:

1. In an impeller of the character described, supporting structure including a casing, a nose rotatable with respect to said casing, a hub in said nose, a power take-off in said casing, driving connections between said hub and said power take-off, adjustable pitch blades carried by said hub, a longitudinally movable shaft extending through said hub and journaled in said casing, means operatively connecting said shaft to said blades whereby longitudinal movement of said shaft adjusts the pitch of said blades, an abutment element carried by said shaft, a collapsible sleeve normally in engagement with said abutment element, spring means normally urging said shaft in a direction opposed by the engagement of said abutment element and said collapsible sleeve, and governor mechanism for causing said sleeve to collapse and permit movement of said shaft under the influence of said spring means when a certain predetermined speed of rotation is exceeded.

2. In an impeller of the character described, supporting structure including a casing, a nose rotatable with respect to said casing, a hub in said nose, a power take-off in said casing, driving connections between said hub and said power take-off, adjustable pitch blades carried by said hub, a longitudinally movable shaft extending through said hub and journaled in said casing, means operatively connecting said shaft to said blades whereby longitudinal movement of said shaft adjusts the pitch of said blades, an abutment element carried by said shaft, a collapsible sleeve normally in engagement with said abutment element, spring means normally urging said shaft in a direction opposed by the engagement of said abutment element and said collapsible sleeve, governor mechanism for causing said sleeve to collapse and permit movement of said shaft under the influence of said spring means when a certain predetermined speed of rotation is exceeded, and means on said sleeve for varying the predetermined speed at which said sleeve collapses.

3. In an impeller of the character described, supporting structure including a casing, a nose rotatable with respect to said casing, a hub in said nose, a power take-off in said casing, driving connections between said hub and said power take-off, adjustable pitch blades carried by said hub, a longitudinally movable shaft extending through said hub and journaled in said casing, means operatively connecting said shaft to said blades whereby longitudinal movement of said shaft adjusts the pitch of said blades, actuator means in said casing operatively connected to said shaft for causing longitudinal movement thereof to adjust the pitch of the blades, a remote control operatively connected to said actuator means, a governor mounted on an end of said longitudinally movable shaft, a sleeve connected to said governor longitudinally shiftable at predetermined speeds of rotation of said longitudinally movable shaft, abutment means carried by said shaft, a collapsible member with longitudinally extending flexible fingers engaging said abutment means and embraced by said governor sleeve for returning the blades to a fully feathered position when a predetermined speed of rotation is exceeded to longitudinally move the governor sleeve thereby displacing said fingers from said abutment means carried by said shaft, spring means for moving said shaft longitudinally when said fingers disengage said abutment, a gear with a helically slotted sleeve mounted on said shaft, a gear carried by each blade engageable with said first gear, and a pin projecting from and carried by said shaft extending into said helical slots of the said gear sleeve, whereby longitudinal movement of the shaft moves said pin in the helical slots and turns said first mentioned gear engaged with said blade gears to feather the blades.

ROBERT B. COTTON.

REFERENCES CITED

The following references are of record in the file of this patent:

UNITED STATES PATENTS

| Number | Name | Date |
|---|---|---|
| 1,405,643 | Weaver | Feb. 7, 1922 |
| 1,891,272 | Slonimsky | Dec. 20, 1932 |
| 2,229,058 | Dicks | Jan. 21, 1941 |
| 2,319,592 | Fiedler | May 18, 1943 |
| 2,360,792 | Putnam | Oct. 17, 1944 |